April 28, 1970 H. G. LA VELLE ET AL Re. 26,868
USED BRICK CLEANING APPARATUS
Original Filed Sept. 25, 1961
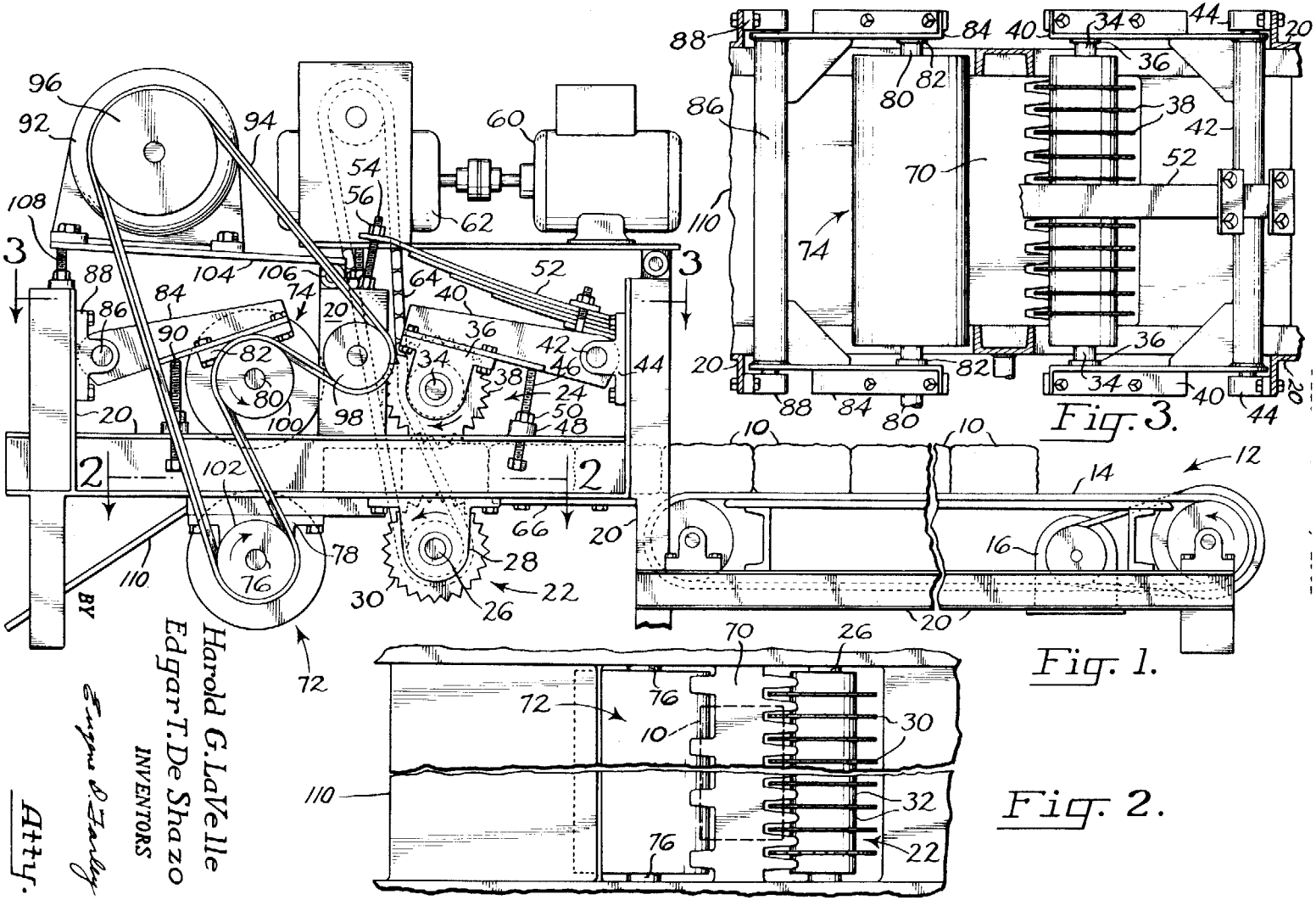
Harold G. LaVelle
Edgar T. De Shazo
INVENTORS
BY Eugene D. Farley
Atty.

United States Patent Office

Re. 26,868
Reissued April 28, 1970

26,868

USED BRICK CLEANING APPARATUS

Harold G. La Velle and Edgar T. De Shazo, Seattle, Wash., by Data-Link Corp. of San Mateo, Calif., a corporation of Delaware, assignee Original No. 3,087,483, dated Apr. 30, 1963, Ser. No. 140,479, Sept. 25, 1961. Application for reissue Dec. 12, 1968, Ser. No. 822,331

Int. Cl. B28d *1/00*

U.S. Cl. 125—26 8 Claims

Matter enclosed in heavy brackets [ ] appears in the original patent but forms no part of this reissue specification; matter printed in italics indicates the additions made by reissue.

*ABSTRACT OF THE DISCLOSURE*

*A machine for cleaning the mortar from used brick wherein the bricks are guided under a group of saw blades which cut and break the mortar on the surfaces of the bricks and impel the bricks toward an oppositely rotating grinding drum which grinds the mortar from said surface.*

This invention relates to apparatus for cleaning the set mortar from used brick.

It is the general object of the present invention to provide used brick cleaning apparatus which:

(1) Efficiently removes the mortar from used brick without breaking them.

(2) Produces used brick of premium commercial quality having smooth, clean face surfaces.

(3) Is of high capacity, a single operator being able to clean with it used brick at the rate of 12,000–18,000 per working day.

(4) Is readily portable from place to place.

(5) Will accommodate bricks of varying thicknesses.

(6) Is adjustable to compensate for wear of the working surfaces.

The manner in which the foregoing and other objects of the invention are accomplished will be apparent from the accompanying specification and claims considered together with the drawings, wherein:

FIG. 1 is a view in side elevation of the presently described used brick cleaning apparatus;

FIG. 2 is a fragmentary plan view looking in the direction of the arrows of line 2—2 and illustrating the pathway along which the bricks move as they are cleaned; and FIG. 3 is a sectional view in plan taking along line 3—3 of FIG. 1.

Generally stated, the used brick cleaning apparatus of our invention includes a pair of spaced, parallel toothed rolls. The roll spacing is predetermined to pass a brick and the roll teeth are of sufficient length and number to penetrate and disintegrate the mortar. Drive means are provided for driving the toothed rolls, as are resilient means for pressing the rolls resiliently together as the bricks pass between them.

Downstream from the toothed rolls are a pair of parallel, spaced abrasive rolls substantially aligned with, but separate from, the toothed rolls in a horizontal plane. The abrasive roll spacing is predetermined to pass a brick, and the abrasive content of the rolls is of such a character as to clear from the face surfaces of the brick residual mortar not removed by the toothed rolls. Resilient means continuously urge the abrasive rolls into pressure engagement with the brick and second drive means drive the abrasive rolls in directions of rotation opposite to that of the corresponding toothed rolls. Brick guide means are disposed between the toothed and abrasive rolls positioned for guiding bricks between the abrasive rolls as they are ejected from the toothed rolls.

Thus the toothed rolls serve the dual function of driving the bricks through the machine while contemporaneously disintegrating and separating the mortar from all six sides of a brick. The abrasive rolls, operating in a direction counter to the toothed rolls, scrub from the two opposite face surfaces any residual mortar which may have been left by the operation of the toothed rolls.

Considering the foregoing in greater detail and with particular reference to the drawings:

Used bricks 10 encrusted with mortar are fed to the apparatus by an infeed conveyor 12 which may comprise an endless rubber belt 14 driven by motor 16. Conveyor 12 is aligned with the cleaning unit housed in a frame 20.

Two cleaning units are mounted on the frame. The first is designed to penetrate and disintegrate the mortar on the brick surfaces while the second is designed to remove any residual mortar and smooth off the two face surfaces of the brick.

The first, or mortar-disintegrating, unit comprises a pair of parallel, vertically spaced apart toothed rolls 22, 24, the construction of which is particularly evident from FIG. 2. The lower toothed roll 22 includes a shaft 26 rotatably mounted between bearings 28 fixed to the underside of frame 20. Mounted on the roll are plurality of saw blades 30, separated by spacers 32. The number of blades, their spacing from each other, and the length of the teeth with which they are provided all are calculated to disintegrate the mortar encrusting the brick so that it is removed from all six sides.

Upper toothed roll 24 is similarly constructed of a shaft 34 rotatably mounted in bearings 36 and supporting a plurality of axially spaced saw blades 38.

The upper toothed roll assembly is mounted on a pair of arms 40, the ends of which are pivoted to shaft 42 rotatably mounted in bearings 44. Upper roll 24 thus is mounted for angular movement toward and away from lower roll 22.

The extent of such movement is limited by a stop member comprising a screw 46 threaded through an internally threaded member 48 carried by frame 20. The end of the screw bears against arm 40 and may be locked in any desired position of adjustment by lock nut 50.

In order to accommodate bricks of varying thickness, as well as to maintain the toothed rolls constantly in driving and mortar-disintegrating engagement with the bricks, there is provided resilent means in the form of a leaf spring 52, the inner end of which is welded to shaft 42. The outer end of the spring is provided with an adjustment comprising a bolt 54 penetrating an opening in the leaf spring. The tension of the latter then may be adjusted by adjustment of nut 56 threaded on bolt 54.

Toothed rolls 22, 24 are driven in opposite directions of rotation and in the feed direction by means of a motor 60 coupled to a gear reducer 62. The latter drives a chain 64 which engages sprockets on shafts 22, 24 in the manner illustrated in FIG. 1.

Bricks continuously urged into the apparatus by infeed conveyor 12 pass over a plate 66 on the bottom of the frame which guides them between rolls 22, 24. The saw teeth on the rolls then crunch into the encrusting mortar, positively driving the bricks between the rolls while at the same time disintegrating and loosening the mortar. About 90% of the mortar is removed at this stage of the operation and drops in small fragments downwardly to offbearing means, not illustrated.

The partially cleaned bricks then are ejected onto a second guide plate 70 (FIG. 2) the leading and trailing edges of which are serrated to enable close approach of the plate to the rolls. This plate preferably has a length which is substantially an even multiple of the brick width. Accordingly, a brick ejected from roll 24 is completely free from abrasive action until it is passed to and completely through the second cleaning unit of the apparatus. This avoids scouring out cavities in the face surfaces of the brick.

The second cleaning unit of the apparatus comprises a pair of abrasive rolls 72, 74. Each comprises a cylinder fabricated of abrasive material such as emery having a grain size adequte to remove the remining mortar on the two face surfaces of the brick, while smoothing and polishing these surfaces.

Lower abrasive roll 72 is mounted on a shaft 76 journaled in bearings 78 which are fixed to the underside of frame 20.

Upper abrasive roll 74 is fixed to a shaft 80 journaled in bearings 82. As in the case of upper toothed roll 24, the upper abrasive roll 74 is mounted for angular movement toward and away from the lower abrasive roll 72. To this end bearings 82 are bolted to arms 84 which in turn are pivoted on shafts 86. The latter shafts are rotatably mounted in bearings 88 fixed to vertical members of frame 20.

The substantial weight of upper abrasive roll 74 is sufficient to maintain the roll resiliently in contact with the bricks. However, stop means comprising adjustable bolt 90 is provided to limit its lowermost position.

Drive means are provided which drive rolls 72, 74 in a direction of rotation counter to that of toothed rolls 22, 24 so that they oppose the forward-driving action of the latter. This enables the abrasive rolls to scour the face surfaces of the bricks in the desired manner.

To this end rolls 72, 74 are driven by a motor 92 which drives belt 94 reeved in the indicated manner about pulley 96 on the motor shaft, idler pulley 98 on a frame member, pulley 100 on the shaft 80 of upper roll 74, and pulley 102 on shaft 76 of lower roll 72.

The tension on belt 84 is adjusted by mounting motor 92 on a base plate 104, one end of which is pivoted to shaft 106. The position of the plate then may be adjusted by means of adjustment screw 108.

Bricks fed into the apparatus by conveyor 12 thus are continuously urged across guide plate 66 between toothed rolls 22, 24. These dig into the encrusting mortar, disintegrating it while at the same time driving the bricks at a regular rate through the apparatus.

After leaving rolls 22, 24, the bricks pass across serrated guide plate 70 and between abrasive rolls 72, 74 which give their face surfaces their final polishing. They then are discharged from the apparatus through chute 110.

It is to be understood that the form of our invention, herewith shown and described, is to be taken as a preferred example of the same, and that various changes in the shape, size and arrangement of parts may be resorted to without departing from the spirit of our invention, or the scope of the subjoined claims.

Having now described our invention, we claim:

1. Apparatus for cleaning mortar from used brick which comprises a pair of spaced, parallel, toothed rolls, the roll spacing being predetermined to pass a brick and the roll teeth being sufficient in length and number to penetrate and disintegrate the mortar, resilient means *in engagement with* [continuously urging] the toothed rolls *continuously urging them* into pressure engagement with the bricks, first drive means *engaging* [driving] the toothed rolls *to drive them* in opposite directions of rotation, *the directions of rotation being such as to drive bricks engaged by the rolls through the apparatus,* a pair of parallel spaced abrasive rolls substantially aligned with but separated from the toothed rolls, the abrasive roll spacing being predetermined to pass a brick and the abrasive content of the rolls being of a character to clean from the face surfaces of the brick residual mortar not removed by the toothed rolls, second drive means *engaging* [driving] the abrasive rolls *to drive them* in directions of rotation opposite to each other and to the respective toothed rolls, *whereby they oppose the movement of bricks through the apparatus,* and brick guide means disposed between the toothed and abrasive rolls and positioned for guiding between the abrasive rolls bricks ejected from between the toothed rolls.

2. The apparatus of claim 1 including conveyor means stationed adjacent the infeed side of the toothed rolls and aligned with the opening between the same for feeding bricks thereto.

3. The apparatus of claim 1 wherein each of the toothed rolls comprises a shaft having mounted thereon a plurality of spaced apart circular saw blades.

4. The apparatus of claim 1 wherein one of the toothed rolls is mounted between pivoting arms for angular movement toward and away from the second tooth roll and wherein the resilient means comprises a leaf spring positioned for urging the arms in the direction of the second toothed roll.

5. The apparatus of claim 4 including stop means for adjustably locating the position of the angularly movable toothed roll.

6. The apparatus of claim 4 including tensioning means for adjusting the resilient pressure exerted by the resilient means to the predetermined value.

7. The apparatus of claim 1, wherein the guide means for guiding bricks from the toothed rolls to the abrasive rolls comprises a plate, the longitudinal dimension of which is substantially an even multiple of the brick width whereby to insure against gouging of the brick surfaces by the abrasive rolls as the bricks are moved one at a time through the apparatus.

8. The apparatus of claim 1 including discharge means for discharging the bricks from the abrasive rolls.

References Cited

The following references, cited by the Examiner, are of record in the patented file of this patent or the original patent.

UNITED STATES PATENTS

| | | | |
|---|---|---|---|
| 2,170,783 | 8/1939 | Cousart | 125—26 |
| 2,901,868 | 9/1959 | Price | 125—26 X |

FOREIGN PATENTS

| | | |
|---|---|---|
| 500,256 | 12/1919 | France. |
| 313,268 | 7/1919 | Germany. |

HAROLD D. WHITEHEAD, Primary Examiner